G. E. DRUM & J. H. SKITT.
MERCERIZING MACHINE.
APPLICATION FILED AUG. 5, 1908.
983,542.
Patented Feb. 7, 1911.
6 SHEETS—SHEET 5.
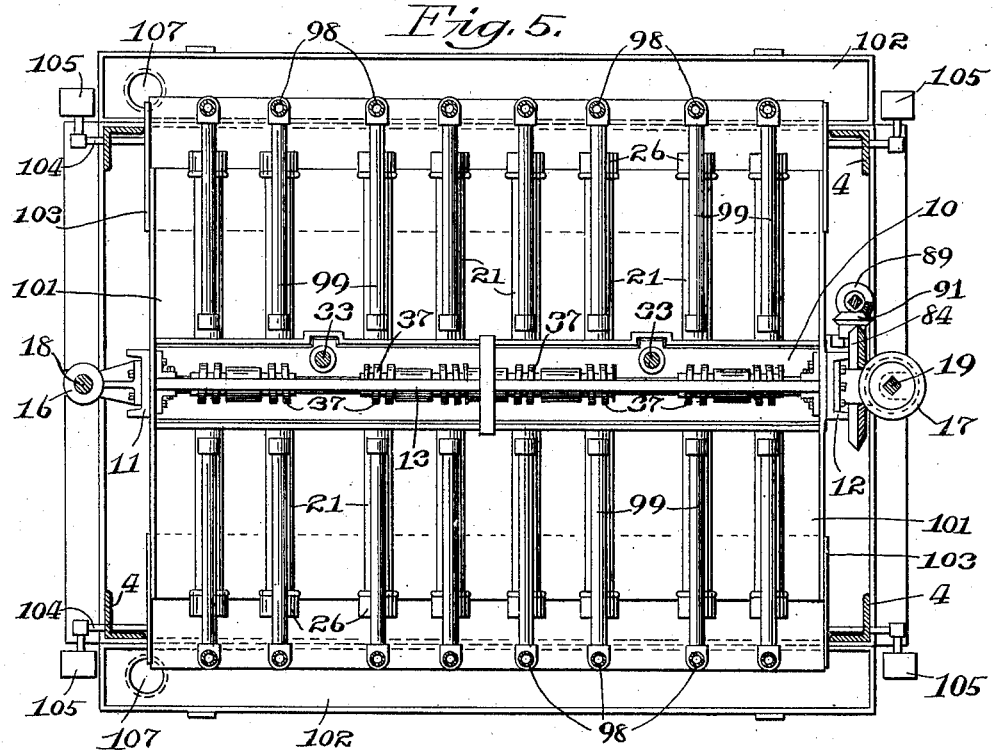
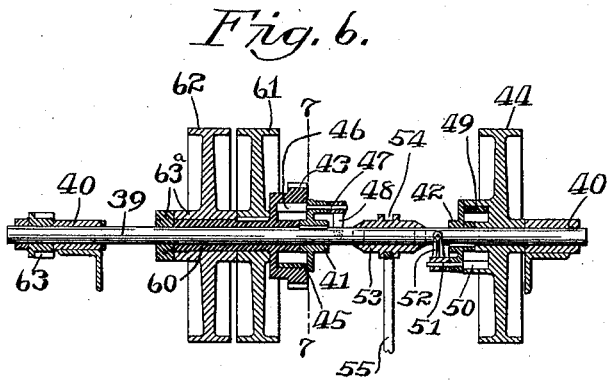
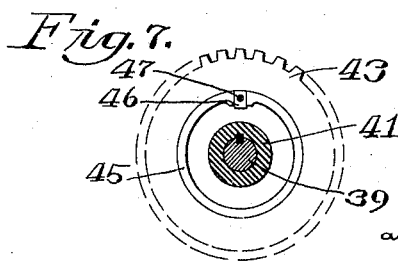
WITNESSES:
INVENTORS
George E. Drum
and James H. Skitt
by A. V. Groupp
ATTORNEY.

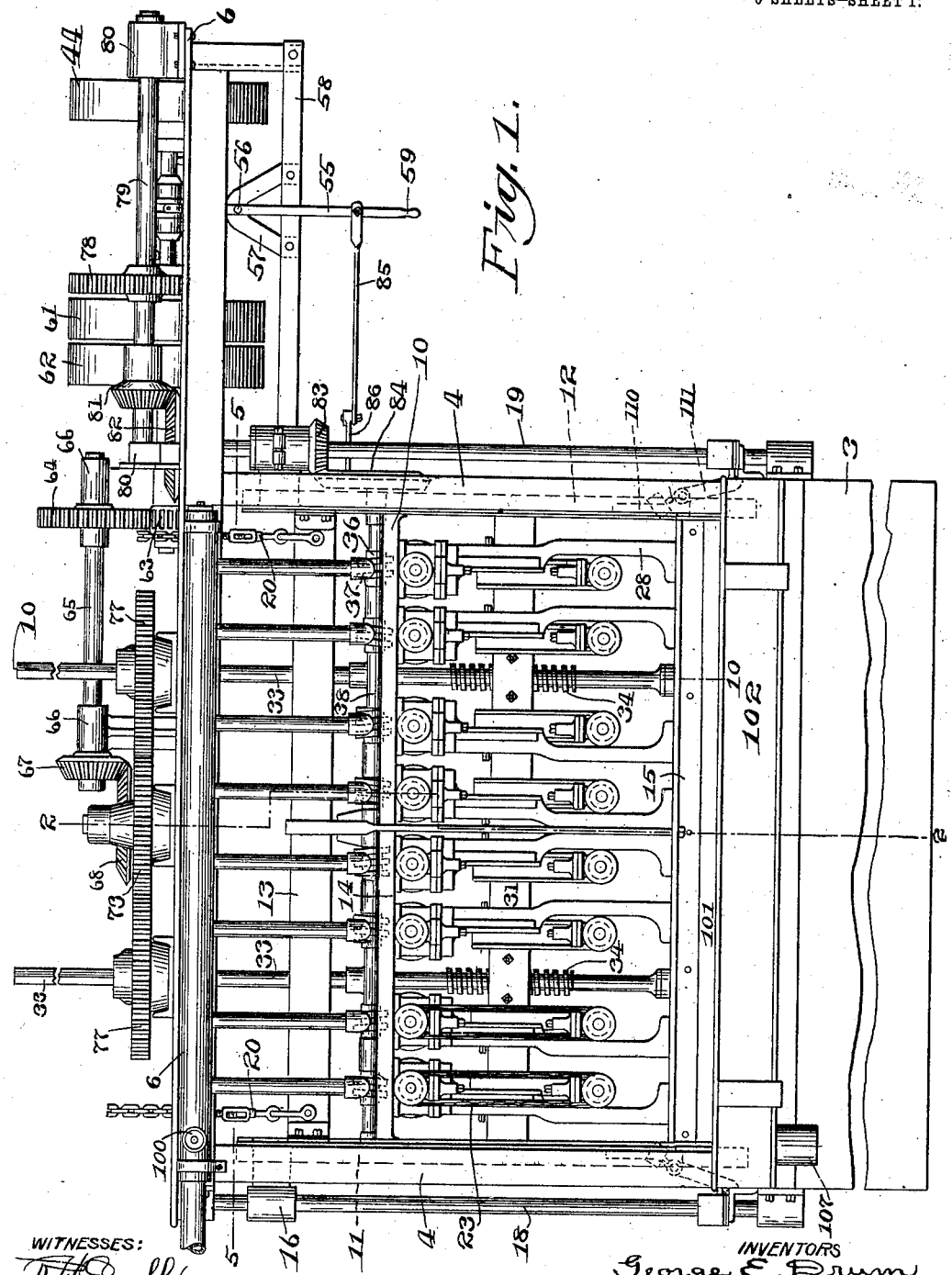

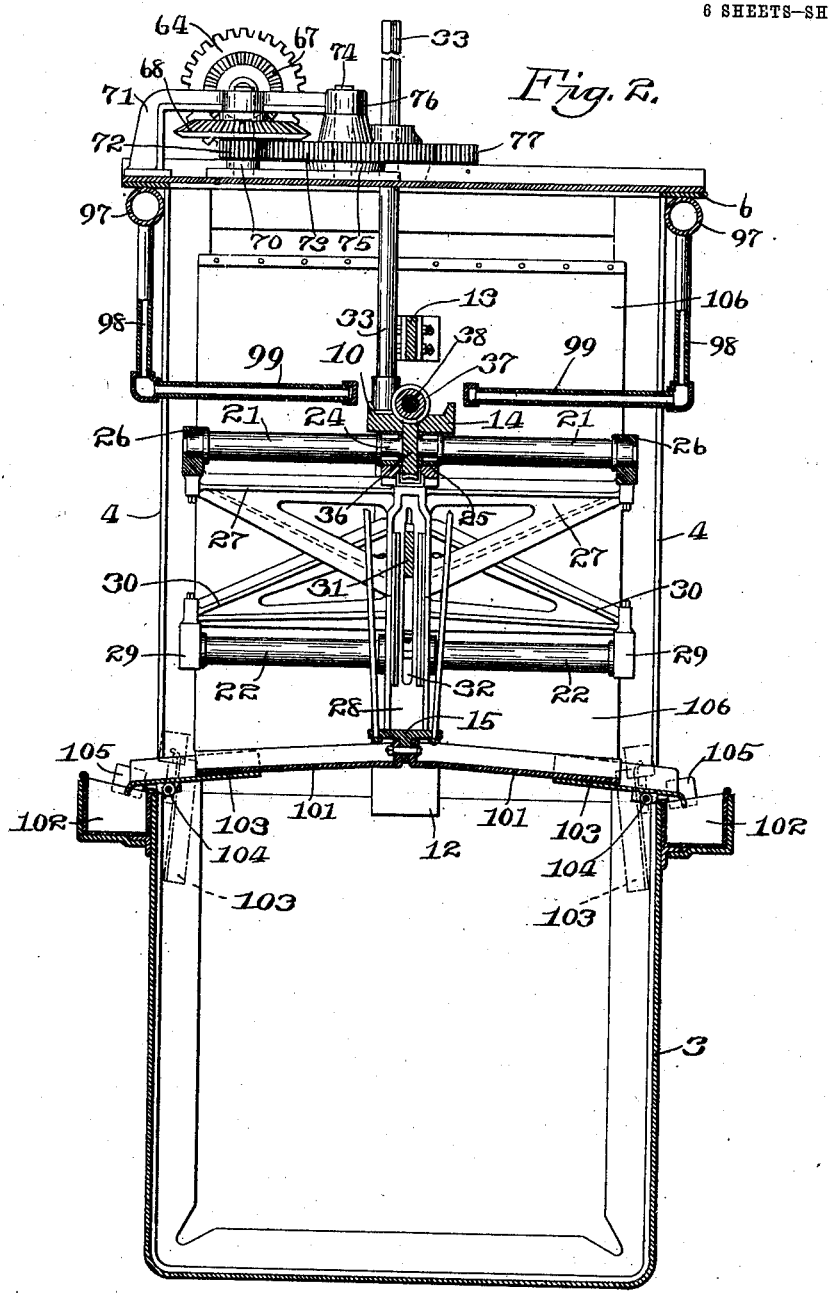

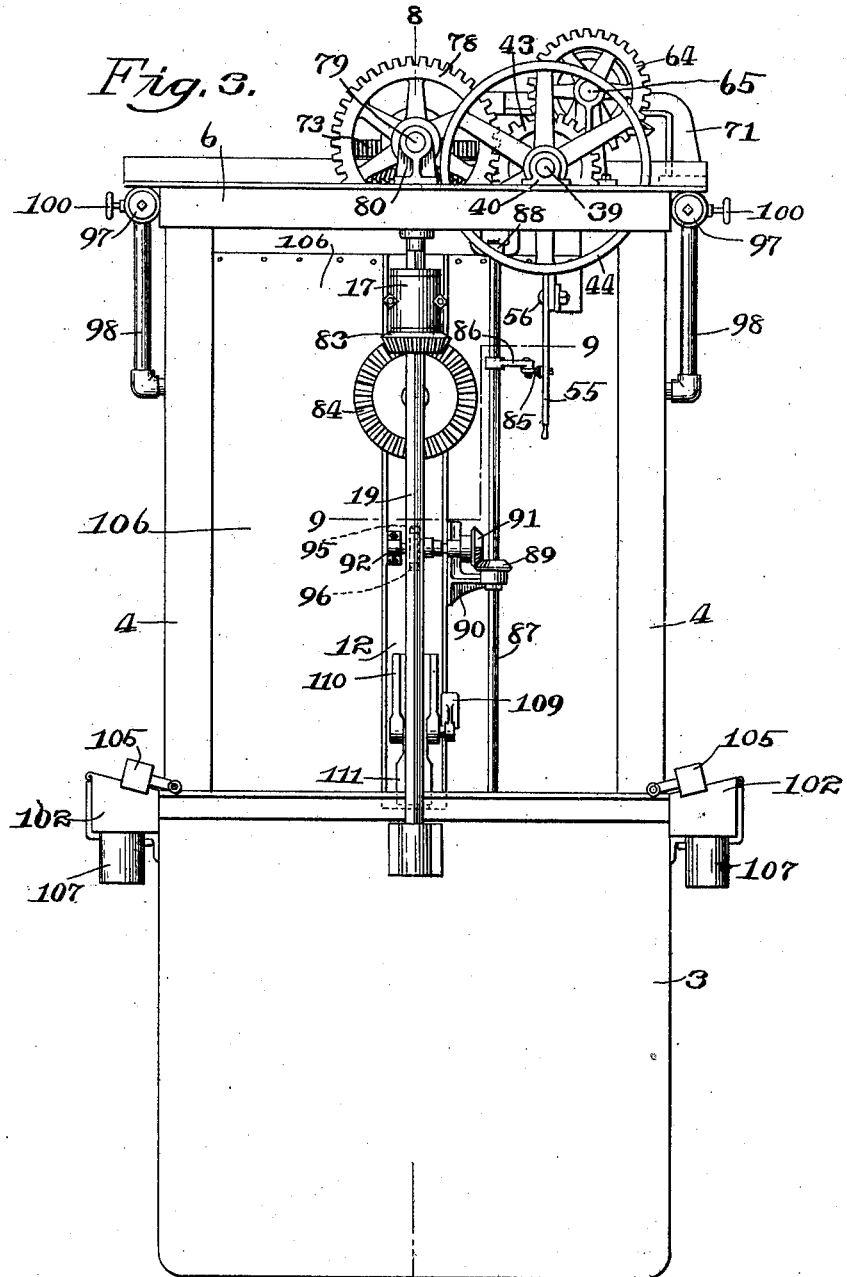

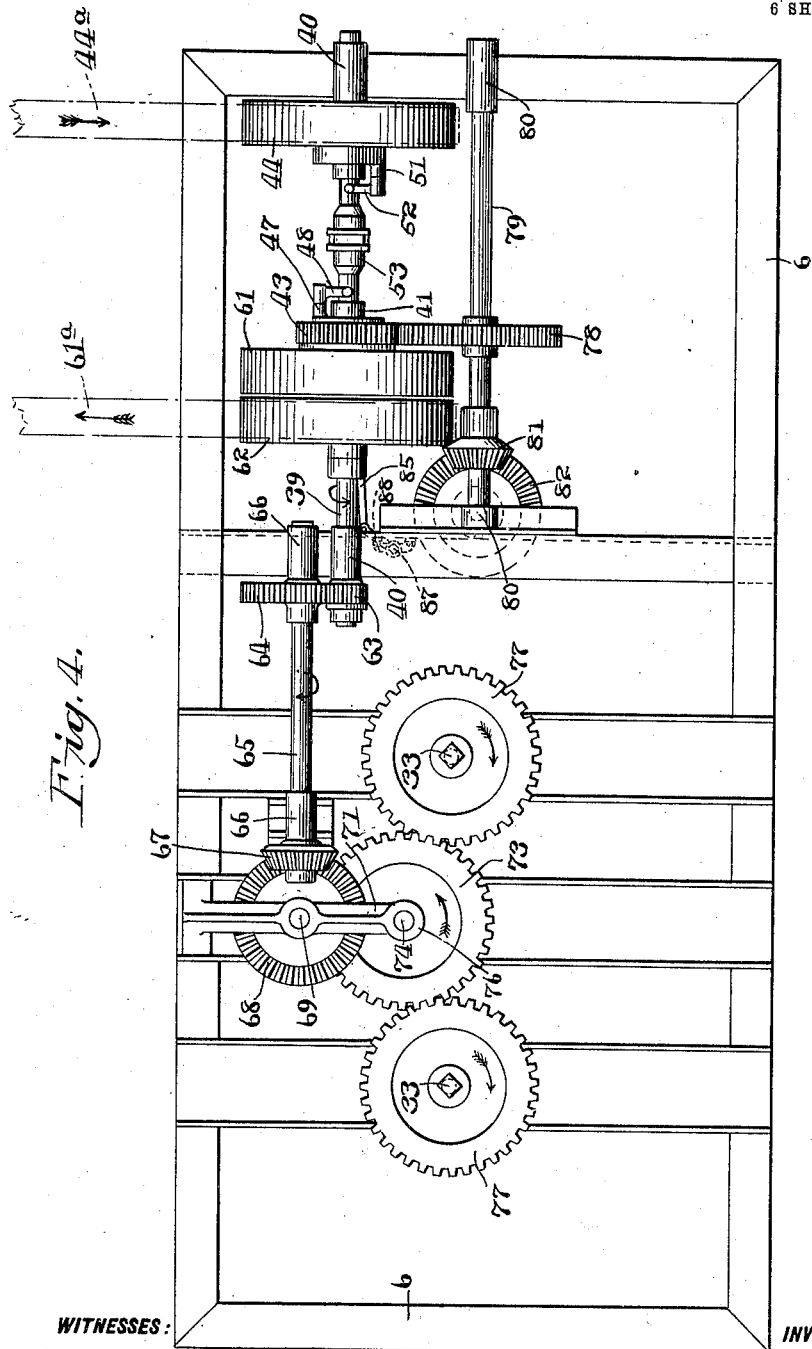

G. E. DRUM & J. H. SKITT.
MERCERIZING MACHINE.
APPLICATION FILED AUG. 5, 1908.
983,542.
Patented Feb. 7, 1911.
6 SHEETS—SHEET 6.
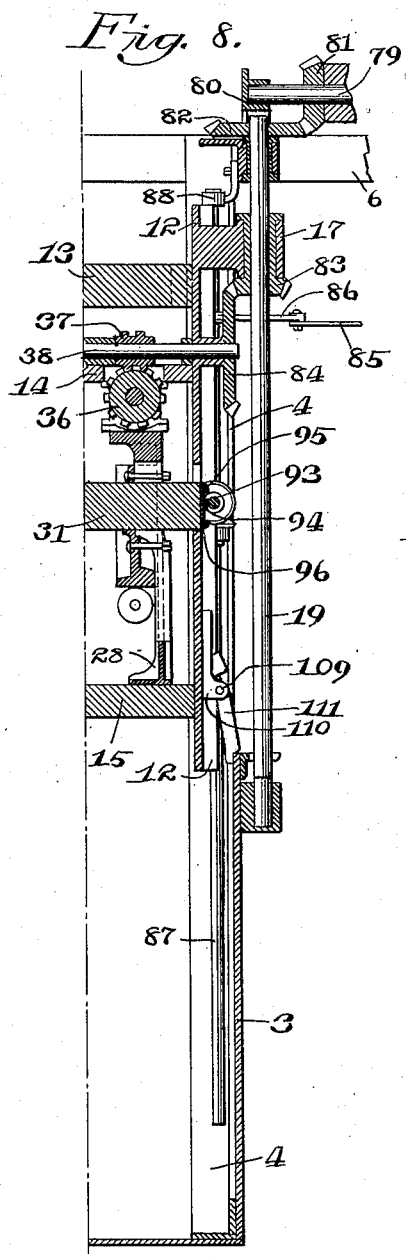
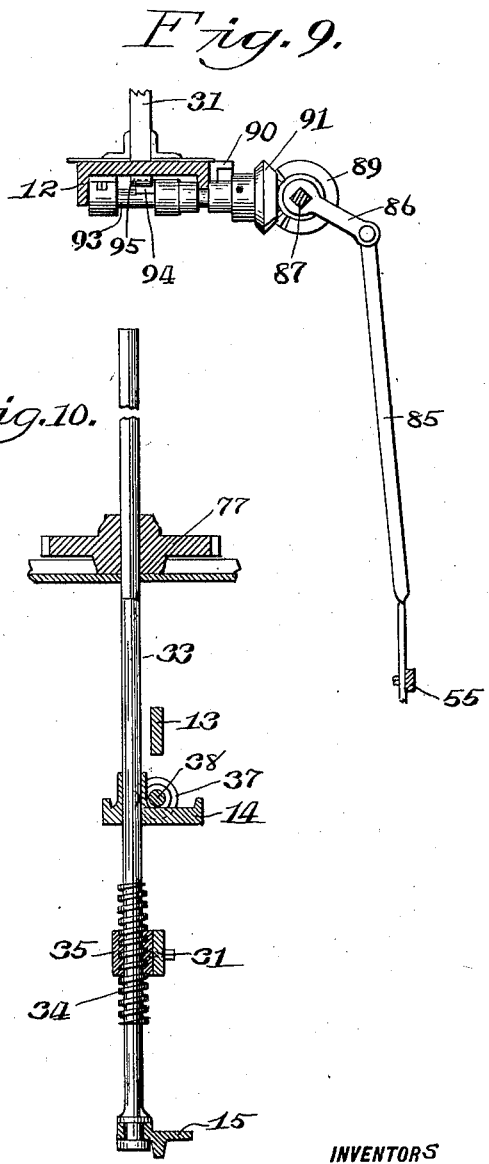
WITNESSES:
INVENTORS
George E. Drum
and James H. Skitt
by A. V. Groat
ATTORNEY.

UNITED STATES PATENT OFFICE.

GEORGE E. DRUM AND JAMES H. SKITT, OF PHILADELPHIA, PENNSYLVANIA, ASSIGNORS TO ROBERT P. SMITH AND SAID GEORGE E. DRUM, OF PHILADELPHIA, PENNSYLVANIA.

MERCERIZING-MACHINE.

983,542.   Specification of Letters Patent.   Patented Feb. 7, 1911.

Application filed August 5, 1908. Serial No. 447,014.

*To all whom it may concern:*

Be it known that we, GEORGE E. DRUM, a citizen of the United States, and JAMES H. SKITT, a subject of the King of Great Britain, both residing in the city and county of Philadelphia, State of Pennsylvania, have invented certain new and useful Improvements in Mercerizing-Machines, of which the following is a specification.

This invention relates to mercerizing machines.

The object of the invention is to provide a simple and efficient construction and organization of mechanism whereby the material, yarn, for example, to be mercerized may be first subjected to the mercerizing liquid, and then subjected to a washing operation to remove the mercerizing liquid therefrom.

As generally stated, the invention consists in the provision of a tank to contain the mercerizing liquid, a vertically movable frame provided with yarn carriers and movable into and from the tank and adapted to carry the yarn to be mercerized, a mechanism for actuating the yarn carriers on the frame, and a means for subjecting the yarn carried by the frame to a washing operation when the frame is in the raised position after it has been lowered into the tank to subject the yarn to the mercerizing liquid, and then raised.

The invention consists in the novel construction and combinations of parts which will be hereinafter fully described and claimed.

Reference is made to our co-pending application for a patent for an improvement in mercerizing machines, Serial No. 525,167.

In the drawings:—Figure 1 is a side elevation, partly broken away, of our improved mercerizing machine. Fig. 2 is a vertical section, as on the line 2—2 of Fig. 1. Fig. 3 is an elevation of the right hand end of the machine shown in Fig. 1. Fig. 4 is a plan view of the top frame and the mechanism carried thereby. Fig. 5 is a horizontal section, as on the line 5—5 of Fig. 1. Fig. 6 is a longitudinal section of the parts carried by the main driving shaft and adjuncts. Fig. 7 is a transverse section thereof, as on the line 7—7 of Fig. 6. Fig. 8 is a vertical section of a portion of one end of the machine, as on the line 8—8 of Fig. 3. Fig. 9 is a section as on the line 9—9 of Fig. 3, showing a part of the automatic belt-shifting mechanism. Fig. 10 is a vertical section as on the line 10—10 of Fig. 1, showing one of the screw-threaded shafts for placing the tension upon the yarn, and adjuncts.

3 designates a rectangular tank adapted to contain the mercerizing liquid. Rising from the four corners of the tank 3, are standards 4, which support a horizontal frame 6 some distance above the top of the tank 3. Between the tank 3 and the frame 6, is arranged a vertically movable, yarn-carrying frame 10, which comprises vertically extending end bars 11 and 12, and longitudinally extending bars 13, 14, and 15, the ends of which are secured to the vertical bars 11 and 12. The end bars 11 and 12 extend upwardly beyond the upper longitudinal bar 13, and the upper ends of the end bars 11 and 12 are provided with projecting brackets or bearings 16 and 17 which surround shafts 18 and 19 respectively. These shafts 18 and 19 extend between suitable bearings on the tank 3, and top frame 6, and serve as a means of guiding the yarn-carrying frame 10.

The upper longitudinal bar 13 of the yarn-carrying frame 10 is connected to the lower ends of chains 20, the upper ends of which are adapted to be connected to any suitable power mechanism by means of which the yarn-carrying frame 10 may be lowered into the tank 3 and raised therefrom to the position shown in the drawings.

The yarn-carrying frame 10 is provided with a series of transversely extending yarn-supports each of which is of the following construction:—21 and 22 are upper and lower yarn-carrying rollers around which skeins of yarn 23 are adapted to be placed as shown at the left hand end of Fig. 1. The upper rollers 21 are fixed to a shaft 24 which is journaled in a central bearing 25 and two outer bearings 26 which project upwardly from a frame 27 carried by a standard 28 which extends between and is secured to the bars 14 and 15. The lower rollers 22 are carried by a shaft which is journaled in outer bearings 29 which project downwardly from a frame 30 which is slidingly fitted to the frame 27 in a manner to be vertically adjustable thereon. The frame 30 of each yarn support of the yarn-carrying frame 10 is secured to and supported by a bar 31 which extends longitudinally through the frames 30 and standards 28, and is vertically adjustable through suitable slots 32 in the standards 28. Thus it will be seen that by raising and lowering the bar 31, the frames 30 and the lower rollers 22 of the yarn supports carried thereby may be raised and lowered with relation to the upper rollers 21 of the yarn supports, to stretch or produce tension upon the yarn or relieve such tension, as desired. The raising and lowering of the bar 31 and therewith the rollers 22 is accomplished by two vertically arranged shafts 33 provided with screw-threaded portions 34 which extend through and are engaged with internal screw-threads on bearing blocks 35 which are secured to the bar 31. The shafts 33 are journaled in suitable bearings in the bars 14 and 15, and the upper ends of the shafts 33 extend through and beyond suitable bearings in the top frame 6, and are connected to a mechanism hereinafter described by means of which the shafts 33 may be turned to raise and lower the bar 31 and therewith the rollers 22. The shafts 24 of the upper rollers 21 of each yarn support are each provided with a centrally-arranged worm wheel 36 each of which is in mesh with a worm 37 on a shaft 38 extending longitudinally over the top of the bar 14. This shaft 38 is journaled in suitable bearings on the bar 14 and by turning the shaft 38 by suitable mechanism hereinafter described, the worms 37 will coact with the worm wheels 36 in a manner to rotate the shafts 24 and therewith the upper yarn-carrying rollers 21, thus actuating the skeins of yarn to cause them to travel between and around the rollers 21 and 22.

We shall now describe the mechanism for operating the shafts 33 to stretch and relieve the tension upon the skeins of yarn, and for operating the shaft 38 to cause the skeins of yarn to be actuated to cause them to pass around the rollers 21 and 22.

39 designates the main driving shaft which is journaled in suitable bearings 40 on the top frame 6. Secured to the main shaft 39 are two clutch members 41 and 42 the clutch member 41 being arranged adjacent a gear wheel 43 and the clutch member 42 being arranged adjacent a pulley 44. The gear wheel 43 is provided with a circular concavity within which is arranged a split expansion ring 45. The split portion of the expansion ring 45 is adapted to be engaged by a key 46 on a shaft 47 which extends through the clutch member 41; the shaft 47 being provided with an arm 48 which extends to a position adjacent the main driving shaft 39. Thus it will be seen that if the arm 48 is moved in a direction away from the shaft 39, the key 46 will act upon the expansion ring 45 in a manner to cause it to bind against and engage the wall of the concavity in the gear wheel 43, and thus cause the gear wheel to rotate with the clutch member 41 and shaft 39.

The hub of the pulley 44 is provided with a circular concavity within which is arranged a split expansion ring 49. The split portion of the expansion ring 49 is adapted to be engaged by a key 50 on a shaft 51 which extends through the clutch member 42, the shaft 51 being provided with an arm 52 which extends to a position adjacent the main driving shaft 39. Thus it will be seen that if the arm 52 is moved in a direction away from the shaft 39, the key 50 will act upon the expansion ring 49 in a manner to cause it to bind against and engage the wall of the concavity in the hub of the pulley 44, and thus cause the pulley to rotate with the clutch member 42 and shaft 39.

The arms 48 and 52 of the clutch members 41 and 52 are adapted to be moved outwardly by the beveled ends of a collar 53 which is slidingly fitted to the main shaft 39 between the arms 48 and 52. The collar 53 is provided with a circumferential groove 54 into which extends the upper end of an operating lever 55 which is pivoted as at 56 to a bracket 57 on a bar 58 of the top frame 6. The lower end of the lever 55 is provided with a suitable handle 59 by means of which the lever may be operated to move the collar 53 into engagement with either the arm 48 or arm 52 and thus move either of said arms in a direction away from the shaft 39 and thus cause the shaft 39 to turn with either the gear wheel 43 or pulley 44, as desired.

The gear wheel 43 is provided with an elongated hub 60 which has mounted thereon two pulleys 61 and 62. The pulley 61 is fixed to the hub 60, and the pulley 62 is loosely mounted thereon between the pulley 61 and the collar 63$^a$ on the end of the hub 60. The pulleys 44 and 61 are adapted to be engaged by driving belts 44$^a$ and 61$^a$ traveling in reverse directions, whereby, when the collar 53 is adjusted to move the arm 48 outwardly to operate the clutch member 41, the pulley 61 and gear wheel 43 will turn the shaft 39 in one direction; and when the collar 53 is adjusted to move the arm 51 outwardly to operate the clutch member 42, the pulley 44 will turn the shaft 39 in the reverse direction. When the collar 53 is moved to the central position between the arms 48 and 52, and the belt for actuating the pulley 61 is shifted into engagement with the pulley 62, the shaft 39 and gear wheel 43 will remain idle.

The shafts 33 are operated from the main driving shaft 39 by the following mechanism:—One end of the shaft 39 is provided with a pinion 63 which coacts with a gear wheel 64 on one end of a shaft 65 which is journaled in bearings 66 on the top frame 6. The other end of the shaft 65 is provided with a beveled gear wheel 67 which coacts with a similar wheel 68 on a short shaft 69 which is journaled in a bearing 70 on the top frame 6 and a bracket 71 thereon. This rectly above the upper yarn-carrying rollers 21 when the yarn-carrying frame 10 is in the raised position shown in the drawings. The bottoms of the pipes 99 are perforated for the discharge of water when the valves 100 of the pipes 97 are opened. Thus it will be seen that by opening the valves 100 water may be discharged upon the yarn carried by the rollers of the yarn-carrying frame 10. After the water thus discharged has passed through the yarn, it falls upon two downwardly and outwardly inclined plates 101, the inner edges of which are secured to the bar 15 of the yarn-carrying frame. These plates 101 extend beneath the yarn-carrying rollers 21 and 22, and they are directed toward longitudinally arranged troughs 102 which are mounted on the upper portions of the sides of the tank 3. Between the outer edges of the plates 101 and the troughs 102 are plates 103 which are mounted on shafts 104 which extend outwardly through the standards 4. The outer ends of the shafts 104 are provided with weighted arms 105 which, when moved to one side of the vertical centers of the shafts 104 will support the plates 103 in the full line position shown in Fig. 2, and which, when moved to the other side of the vertical centers of the shafts 104, will support the plates 103 in the position shown by dot-and-dash lines in Fig. 2. When the plates 103 are in the full line position the inner edges of the plates abut against the bottoms of the plates 101 and the outer edges of the plates 103 extend over the tops of the troughs 102. Thus the plates 103 form continuations of the plates 101, and serve to direct the water to the troughs 102 after it falls upon the plates 101. When the plates 103 are in the dot-and-dash line position, they will permit the lowering and raising of the yarn-carrying frames 10 and the parts carried thereby. The ends of the plates 101 and 103 are bent upwardly and the yarn-carrying frame 10 is provided with vertical end plates 106 which form continuations of the upturned ends of the plates 101 thereby preventing water discharged from the pipes 99 from splashing through the standards 4 at the ends of the machine, and causing the water to be directed to the troughs 102.

The troughs 102 are provided with suitable outlets 107 which may be connected to any suitable drain pipe to carry off the water discharged from the machine during the washing of the yarn.

Pivotally connected, as at 109, to a bracket 110 on each end bar 11 and 12, is a lever 111, the upper end of which is weighted and the lower end of which is notched and is adapted to engage the upper edge of the tank 3 to support the yarn-carrying frame 10 when it is in the raised position. Before lowering the yarn-carrying frame into the tank 3, it is slightly raised, to permit the upper ends of the levers 111 to be moved outwardly of the vertical centers of the pivot points 109, thereby moving the lower ends thereof inwardly against the bars 11 and 12 and permitting the subsequent lowering of the yarn-carrying frame 10.

Assuming that the machine is at rest—that is to say, the clutch collar 53 is in the central position, and the belt 61$^a$ is in engagement with the loose pulley 62, and the belt 44$^a$ is in engagement with the loose pulley 44—the skeins of yarn 23 are placed upon the rollers 21 and 22 as indicated at the left hand end of Fig. 1. After all the rollers have thus been supplied with the skeins of yarn, the belt 61$^a$ is shifted into engagement with the pulley 61, thus causing the rotation of the gear wheel 43 independently of the main shaft 39. The gear wheel 43 causes the rotation of the worm shaft 38 through the shafts 19 and 79 and the gearing connected therewith. The rotation of the worm shaft 38 causes the rotation of the upper rollers 21, as previously explained, and the turning of the upper rollers 21 causes the yarn upon the rollers 21 and 22 to travel between and around the rollers 21 and 22, and this travel of the yarn between and around the rollers continues during the subsequent operations wherein the yarn is placed under tension, subjected to the mercerizing liquid, and then washed. The next operation is to stretch the yarn, or place it under tension. This is accomplished by operating the clutch lever 55 by hand to move the clutch collar 53 into engagement with the clutch member 41, thereby locking the gear wheel 43 and therewith the pulley 61 to the main shaft 39. The belt 61$^a$ having been moved into engagement with the pulley 61, thus causes the rotation of the main shaft 39 in a reverse direction to that indicated by the arrow in Fig. 4. This causes the turning of the shaft 65 and the gearing connected therewith in a manner to cause the gear wheels 77 and the shafts 33 to be turned in a reverse direction to that indicated by the arrows in Fig. 4, thereby causing the screw-threads 34 to move the bar 31 and frames 30 and lower rollers 22 downwardly with relation to the upper rollers 21. This downward movement of the bar 31 is continued until sufficient tension has been put upon the yarn, thereupon the clutch lever is operated to move the clutch collar 53 to the central position thus stopping the rotation of the main shaft and the further downward movement of the lower rollers. This being done, the yarn upon the rollers 21 and 22 continues to travel between and around the same, as previously explained; and while the yarn is traveling around the rollers 21 and 22, the yarn-carrying frame 10 and the parts carried thereby are lowered short shaft 69 is provided with a pinion 72 which engages a gear wheel 73 on a short shaft 74 journaled in a bearing 75 on the top frame 6 and a bearing 76 on the bracket 71. The gear wheel 73 coacts with two gear wheels 77 through the hubs of which extend vertical shafts 33 hereinbefore mentioned, the gear wheels 77 being supported by cross bars of the top frame 6. The upper ends of the shafts 33 are squared and are slidingly fitted to the hubs of the gear wheels 77, whereby, when the yarn-carrying frame 10 is raised and lowered the shafts 33 will slide through the hubs of the gear wheels 77 without affecting the operative connection of the gear wheels with the shafts.

The shaft 38 is operated from the main driving shaft 39 by the following mechanism:—The gear wheel 43 is in mesh with a gear wheel 78 on a shaft 79 which extends parallel to the main shaft 39 and is journaled in suitable bearings 80 on the top frame 6. This shaft 79 is provided with a beveled gear wheel 81 which coacts with a similar wheel 82 secured to the upper end of the vertical shaft 19 hereinbefore mentioned. The shaft 19 is made square, as shown, and it extends through and is slidingly fitted to the hub of a beveled gear wheel 83 which is mounted to rotate in the bearing or bracket 17 which surrounds the shaft 19 and is secured to the vertical bar 12 on the yarn-carrying frame 10. The beveled gear wheel 83 coacts with a similar wheel 84 on the worm shaft 38. Thus it will be seen that the worm shaft 38 may be actuated from the main driving shaft and that during the raising and lowering of the yarn-carrying frame 10 the operative connection between the gear wheels 83 and 84 and the gear wheel 83 and the shaft 19 will not be disturbed, owing to the square shaft 19 and the fact that the gear wheel 83 will be raised and lowered with the yarn-carrying frame 10 by the bearing or bracket 17 secured thereto.

In order to prevent accident to the machine by moving the frames 30 and lower rollers 22 of the yarn-supports too far during the raising and lowering thereof, in stretching the yarn or relieving the tension therefrom, we provide an automatic stop mechanism which will move the clutch collar 53 to the central position and thus render the main driving shaft idle after the frames 30 and rollers 22 have reached a predetermined point in being raised and a predetermined point in being lowered. This automatic stop mechanism is of the following construction:— Pivotally connected to the lower portion of the clutch lever 55 is one end of an arm 85, the other end of which is connected to an arm 86 secured to and extending from a vertically arranged shaft 87, the upper end of which is supported by a bar 88 on the top frame 6, and the lower end of which depends into the tank 3. This shaft 87 is made square as shown, and it extends through and is slidingly fitted to a beveled gear wheel 89 which is rotatably mounted in a bracket 90 on the end bar 12 of the yarn-carrying frame 10, whereby when the yarn-carrying frame is raised and lowered, the beveled gear wheel 89 will be raised and lowered thereby without disturbing its operative connection with the shaft 87. The gear wheel 89 coacts with a beveled gear wheel 91 on a shaft 92 which is journaled in suitable bearings on the end bar 12. The shaft 92 is provided with a wheel or collar 93 carrying a projection 94 which is arranged between an upper projection 95 and a lower projection 96 on the end of the bar 31 which carries the frames 30 and rollers 22. Thus it will be seen that when the bar 31 reaches a predetermined point during the lowering thereof, the projection 95 will engage the projection 94, and when the bar 31 reaches a predetermined point during the raising thereof, the projection 96 will engage the projection 94. When the clutch collar 53 is moved into engagement with the clutch member 41 of the gear wheel 43, the main shaft 39 is turned in a direction to lower the bar 31. Therefore, after the bar 31 has reached a predetermined point during the lowering thereof, the engagement of the projection 95 with the projection 94 will turn the shaft 92, thus causing the turning of the shaft 87 in a direction to move the clutch lever 55 and therewith the clutch collar 53 to the central position, thus stopping the rotation of the main shaft and the further lowering of the bar 31. When the clutch collar 53 is moved into engagement with the clutch member 42 of the pulley 44, the main shaft 39 is turned in the reverse direction to raise the bar 31. Therefore, after the bar 31 has reached a predetermined point during the raising thereof the engagement of the projection 96 with the projection 94 will turn the shaft 92, thus causing the turning of the shaft 87 in a direction to move the clutch lever 55 and therewith the clutch collar 53 to the central position, thus stopping the rotation of the main shaft, and the further raising of the bar 31.

After the yarn upon the yarn-carrying frame 10 has been subjected to the mercerizing liquid within the tank 3, and the yarn-carrying frame is raised to the position shown in the drawings, the washing operation is effected by the following mechanism:—Extending along each side of the upper frame 6 and supported thereby is a water supply pipe 97, which is provided with a series of depending pipes 98, the lower ends of which terminate in inwardly extending pipes 99. The pipes 99 correspond in number with the yarn-carrying rollers 21, and the pipes 99 occupy a position parallel with and diinto the tank 3, thus submerging the yarn in the mercerizing liquid contained within the tank, the plates 103 being first moved to the dot-and-dash line position shown in Fig. 2, and the lever 111 being adjusted to permit the lowering of the yarn-carrying frame 10. After the yarn has been sufficiently subjected to the action of the mercerizing liquid, the yarn-carrying frame 10 is raised to the position shown in the drawings, and the water-receiving plates 103 are adjusted to the full line position shown in Fig. 2, and the levers 111 are automatically adjusted to support the frame 10. This being done, the washing operation takes place by opening the valves 100, thereby discharging water from the pipes 99, which flows through the yarn while it continues to travel between and around the rollers 21 and 22. The water, after being discharged from the pipes 99 falls upon the plates 101, from which it flows over the plates 103 and into the troughs 102, and out through the outlet openings 107. After the yarn has been thoroughly washed to remove the mercerizing liquid therefrom, the clutch lever 55 is operated to move the clutch collar 43 into engagement with the clutch member 42 of the pulley 44, thus causing the rotation of the main shaft 39 in the direction indicated by the arrow in Fig. 4, and thereby causing the rotation of the gear wheels 77 and therewith the shafts 33 in the direction indicated by the arrows in Fig. 4, thereby causing the screw-threads 34 of the shafts 33 to raise the bar 31, thus raising the frames 30, and lower rollers 22, and removing the tension upon the yarn. This being done, the belt 61ᵃ is shifted into engagement with the pulley 62, thereby stopping the operation of the machine and permitting the removal of the yarn for a succeeding operation. After the yarn-carrying frame 10 has been raised after subjecting the yarn thereon to the mercerizing liquid, the yarn may be restretched if desired by operating the clutch lever 55 to move the clutch collar 53 into engagement with the clutch member 48.

We claim:—

1. In a mercerizing apparatus, the combination of a tank to contain the mercerizing liquid, a water discharge pipe supported above the tank, a vertically reciprocative yarn support movable relatively to said tank and to said pipe to a position within the tank and to a position above the tank and beneath the pipe, and means carried by said support and arranged to direct water discharged from the pipe toward one side of the top of the tank when the yarn support is in the raised position.

2. In a mercerizing apparatus, the combination of a tank to contain the mercerizing liquid, a water discharge pipe supported above the tank, a yarn support movable to a position within the tank and to a position above the tank and beneath the pipe, and a water-receiving plate carried with the yarn support and positioned to receive water discharged from said pipe.

3. In a mercerizing apparatus, the combination of a tank to contain the mercerizing liquid, a water discharge pipe supported above the tank, a vertically reciprocative yarn support movable to a position above the tank and beneath the pipe, and a water-receiving plate pivoted to the tank and movable into an operative position to receive water discharged from said pipe and prevent the water from entering the tank and movable also to an inoperative position permitting the yarn support to be lowered into the tank.

4. In a mercerizing apparatus, the combination of a tank to contain the mercerizing liquid, a water discharge pipe supported above the tank, a frame movable from a position within the tank to a position above the tank and beneath the pipe, a yarn support carried by the frame, a water receiving trough adjacent the upper portion of the tank and an inclined water receiving plate carried by the frame below the yarn support, said plate being inclined toward the top of the trough when the frame is in the raised position.

5. In a mercerizing apparatus, the combination of a tank to contain the mercerizing liquid, a water discharge pipe supported above the tank, a frame movable from a position within the tank to a position above the tank and beneath the pipe, a yarn support carried by the frame, an inclined water receiving plate carried by the frame below the yarn support, said plate being inclined toward the top of the trough when the frame is in the raised position, and an adjustable plate movable to and from a position extending between said inclined plate and the top of said trough.

6. In a mercerizing apparatus, the combination of a tank to contain the mercerizing liquid, a water discharge pipe supported above the tank, a frame movable from a position within the tank to a position above the tank and beneath the pipe, a yarn support carried by the frame, and an inclined water receiving plate carried by the frame below the yarn support, said plate being inclined toward the top of the trough when the frame is in the raised position, a pivoted plate movable to and from a position extending between said inclined plate and the top of said trough, and a weighted arm to hold said plate in position.

7. In a mercerizing apparatus, the combination of a tank to contain the mercerizing liquid, a water discharge pipe supported above the tank, a vertically reciprocative frame movable relatively to said tank and to said pipe to a position within the tank and to a position above the tank and beneath the pipe, and means carried by said frame and arranged to direct water discharged from the pipe toward one side of the top of the tank when said frame is in the raised position, a yarn support carried by the frame, and mechanism for actuating the yarn support.

8. In a mercerizing apparatus, the combination of a tank to contain the mercerizing liquid, a fixed frame above the tank, a driving mechanism supported by said frame, a yarn support movable independently of said frame to a position within the tank and to a position above the tank and beneath said frame, and means carried by the support and adjustably connected to and operated by said driving mechanism and operative to stretch the yarn upon the yarn support in any position of the yarn support with respect to said frame.

9. In a mercerizing apparatus, the combination of a tank to contain the mercerizing liquid, a fixed frame above the tank, a driving mechanism supported by said frame, a yarn carrying frame movable to a position within the tank and to a position above the tank, yarn supporting rollers mounted in frames fixed to the yarn carrying frame, yarn stretching rollers mounted in adjustable frames supported by and adjustably connected to the yarn carrying frame, and means carried by the yarn carrying frame and adjustably connected to said driving mechanism and operative in any position of the yarn-carrying frame with respect to said fixed frame for adjusting said adjustable frames.

10. In a mercerizing apparatus, the combination of a tank to contain the mercerizing liquid, a fixed frame above the tank, a driving mechanism supported by said frame, a yarn-carrying frame movable to a position within the tank and to a position above the tank, yarn-supporting rollers mounted in frames fixed to the yarn carrying frame, yarn stretching rollers mounted in adjustable frames supported by and adjustably connected to the yarn carrying frame, a vertically arranged screw-threaded shaft connected to said adjustable frames and carried by said yarn-carrying frame and adjustably connected to said driving mechanism and operative in any position of the yarn-carrying frame with respect to said fixed frame.

11. In a mercerizing apparatus, the combination of a tank to contain the mercerizing liquid, a fixed frame above the tank, a driving mechanism supported by said frame, a yarn carrying frame movable to a position within the tank and to a position above the tank, a bar movable with said frame and vertically adjustable with respect thereto, yarn supporting rollers mounted in frames fixed to the yarn carrying frame, yarn stretching rollers mounted in frames fixed to said bar, and means carried by the yarn carrying frame and adjustably connected to said driving mechanism for adjusting said bar.

12. In a mercerizing apparatus, the combination of a tank to contain the mercerizing liquid, a fixed frame above the tank, a driving mechanism supported by said frame, a yarn carrying frame movable to a position within the tank and to a position above the tank, a bar movable with said frame and vertically adjustable with respect thereto, yarn supporting rollers mounted in frames fixed to the yarn carrying frame, yarn stretching rollers mounted in frames fixed to said bar, and a vertically arranged, screw-threaded shaft connected to said bar, and carried by said yarn carrying frame, and adjustably connected to said driving mechanism.

13. In a mercerizing apparatus, the combination of a tank to contain the mercerizing liquid, a fixed frame, actuating mechanism supported by said frame, a yarn carrying frame movable relatively to said fixed frame to a position within the tank and to a position above the tank and provided with yarn engaging parts, means for moving certain of said yarn engaging parts toward and from other of said yarn engaging parts, said means including a part carried by said movable frame and slidably engaged with a part of said actuating mechanism, and means for automatically stopping the relative movement between said yarn engaging parts when a predetermined position is reached, the last named means including a part carried by said movable frame and slidably engaged with a part of said actuating mechanism.

14. In a mercerizing apparatus, the combination of a tank to contain the mercerizing liquid, a fixed frame, actuating mechanism supported by said frame, a yarn carrying frame movable relatively to said fixed frame to a position within the tank and to a position above the tank, yarn supporting rollers mounted in frames fixed to the yarn carrying frame, yarn stretching rollers mounted in frames carried by a part which is movable vertically with respect to the first named frames, means for moving said part vertically with respect to the first named frames, said means including a part carried by said movable frame and slidably engaged with a part of said actuating mechanism, and means for automatically stopping the movement of said part when a predetermined position is reached, the last named means including a part carried by said movable frame and slidably engaged with a part of said actuating mechanism.

15. In a mercerizing apparatus, the combination of a tank to contain the mercerizing liquid, a fixed frame, actuating mechanism supported by said frame, a yarn carrying frame movable relatively to said fixed frame to a position within the tank and to a position above the tank, yarn supporting rollers mounted in frames fixed to the yarn carrying frame, yarn stretching rollers mounted in frames carried by a part which is movable vertically with respect to the first named frames, means for moving said part vertically in two directions with respect to the first named frames, said means including a part carried by said movable frame and slidably engaged with a part of said actuating mechanism, and means for automatically stopping the movement of said part when it reaches a predetermined position while being lowered, and means for automatically stopping the movement of said part when it reaches a predetermined position while being raised, the last named means including a part carried by said movable frame and slidably engaged with a part of said actuating mechanism.

16. In a mercerizing apparatus, the combination of a tank to contain the mercerizing liquid, a fixed frame above the tank, a driving mechanism supported by said frame, a yarn carrying frame movable independently of said frame to a position within the tank and to a position above the tank and beneath said frame, yarn supporting rollers carried by the yarn carrying frame, and means carried by the yarn carrying frame and adjustably connected to the driving mechanism and operative in any position of the yarn-carrying frame with respect to said fixed frame.

17. In a mercerizing apparatus, the combination of a tank to contain the mercerizing liquid, a fixed frame above the tank, a driving mechanism supported by said frame, a yarn carrying frame movable independently of said frame to a position within the tank and to a position above the tank and beneath said frame, yarn supporting rollers carried by the yarn carrying frame, a shaft carried by the yarn carrying frame, gearing connected to said driving mechanism and adjustably connected to said shaft, and gearing between said shaft and rollers.

18. In a mercerizing apparatus, the combination of a tank to contain the mercerizing liquid, a fixed frame above the tank, a driving mechanism supported by said frame, a yarn carrying frame movable to a position within the tank and to a position above the tank, two yarn supporting rollers carried by the yarn carrying frame, one roller being adjustable toward and from the other roller, means adjustably connected to said driving mechanism for moving one of said rollers toward and from the other, a fixed water discharge pipe located above said rollers when the yarn carrying frame is in the position above said tank, and means to prevent water discharged from the pipe from entering the tank when the yarn support is in the raised position.

19. In a mercerizing apparatus, the combination of a tank to contain the mercerizing liquid, a fixed frame above the tank, a driving mechanism supported by said frame, a yarn carrying frame movable independently of said frame to a position within the tank and to a position above the tank and beneath said fixed frame, two yarn supporting rollers carried by the yarn carrying frame, one roller being adjustable toward and from the other, means adjustably connected to said driving mechanism for moving one of said rollers toward and from the other, and means adjustably connected to said driving mechanism for rotating one of said rollers, each of said means being operative in any position of said yarn-carrying frame with respect to said fixed frame.

20. In a mercerizing apparatus, the combination of a tank to contain the mercerizing liquid, a fixed frame above the tank, a driving mechanism supported by said frame, a yarn carrying frame movable to a position within the tank and to a position above the tank, two yarn supporting rollers carried by the yarn carrying frame, one roller being adjustable toward and from the other, means adjustably connected to said driving mechanism for moving one of said rollers toward and from the other, means adjustably connected to said driving mechanism for rotating one of said rollers, a fixed water discharge pipe located above said rollers when the yarn carrying frame is in the position above said tank, and means to prevent water discharged from the pipe from entering the tank when the yarn support is in the raised position.

In testimony whereof we affix our signatures in presence of two witnesses.

GEORGE E. DRUM.
JAMES H. SKITT.

Witnesses:
SADIE I. HARPER,
A. V. GROUPE.